United States Patent
Tabatowski-Bush

(10) Patent No.: US 9,937,811 B2
(45) Date of Patent: Apr. 10, 2018

(54) VEHICLE AUTHENTICATION FOR A BEV CHARGER

(71) Applicant: Ford Global Technologies, LLC, Dearborn, MI (US)

(72) Inventor: Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 13/946,627

(22) Filed: Jul. 19, 2013

(65) Prior Publication Data

US 2015/0022151 A1 Jan. 22, 2015

(51) Int. Cl.
*H02J 7/00* (2006.01)
*B60L 11/18* (2006.01)

(52) U.S. Cl.
CPC ....... *B60L 11/1846* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .............. B60L 11/1816; B60L 11/1824; B60L 11/1829; B60L 11/1846; B60L 11/182; B60L 22/3016; H02J 5/505; H02J 7/025; H02J 7/0027; H02J 2007/001; H02J 50/80; H02J 50/90
USPC .................................. 320/108–109, 133, 135
See application file for complete search history.

(56) References Cited

U.S. PATENT DOCUMENTS

| | | | |
|---|---|---|---|
| 7,698,078 B2 | 4/2010 | Kelty et al. | |
| 7,917,251 B2 | 3/2011 | Kressner et al. | |
| 8,515,865 B1* | 8/2013 | Marathe | B60L 11/1838 705/39 |
| 2009/0043450 A1 | 2/2009 | Tonegawa et al. | |
| 2009/0174365 A1 | 7/2009 | Lowenthal et al. | |
| 2010/0145540 A1* | 6/2010 | McKenna | 700/295 |
| 2010/0161469 A1 | 6/2010 | Littrell | |
| 2010/0237985 A1 | 9/2010 | Landau-Holdsworth et al. | |
| 2010/0274570 A1* | 10/2010 | Proefke | B60L 11/1824 705/1.1 |
| 2011/0007824 A1 | 1/2011 | Bridges et al. | |

(Continued)

FOREIGN PATENT DOCUMENTS

| | | |
|---|---|---|
| DE | 10304284 A1 | 8/2004 |
| WO | 2010020783 A2 | 2/2010 |

OTHER PUBLICATIONS

Sam Abuelsamid, Ford Announces Electric Vehicle-to-Grid Communications System, http://green.autoblog.com/2009/08/18/ford-announces-electric-vehicle-to-grid-communications-system, Aug. 18, 2009, 13 pgs.

*Primary Examiner* — Paul Dinh
(74) *Attorney, Agent, or Firm* — David B. Kelley; Brooks Kushman P.C.

(57) ABSTRACT

A vehicle system has a first communication device configured to selectively associate with a second communication device of a premise system based on a location of the vehicle with respect to the premise system and a vehicle identification. A charging control system is configured to permit charging of the vehicle in response to the selective association between the first and second communication devices.

12 Claims, 3 Drawing Sheets

(56) References Cited

U.S. PATENT DOCUMENTS

| | | | |
|---|---|---|---|
| 2011/0010043 A1* | 1/2011 | Lafky | B60L 11/1842 701/31.4 |
| 2011/0031929 A1 | 2/2011 | Asada et al. | |
| 2011/0077809 A1 | 3/2011 | Leary | |
| 2011/0140657 A1* | 6/2011 | Genzel et al. | 320/109 |
| 2011/0202418 A1* | 8/2011 | Kempton et al. | 705/26.1 |
| 2011/0239116 A1* | 9/2011 | Turner et al. | 715/705 |
| 2012/0309455 A1* | 12/2012 | Klose | B60L 11/1838 455/557 |
| 2013/0024306 A1* | 1/2013 | Shah et al. | 705/17 |
| 2013/0029595 A1* | 1/2013 | Widmer | H04B 5/0031 455/39 |
| 2013/0038272 A1* | 2/2013 | Sagata | B60L 11/182 320/106 |
| 2013/0038424 A1* | 2/2013 | Katar | H04L 67/125 340/5.8 |
| 2013/0067253 A1* | 3/2013 | Tsuda | B60L 8/003 713/300 |
| 2013/0110296 A1* | 5/2013 | Khoo et al. | 700/286 |
| 2013/0179061 A1* | 7/2013 | Gadh et al. | 701/123 |
| 2013/0226441 A1* | 8/2013 | Horita | B60Q 9/00 701/118 |
| 2013/0238536 A1* | 9/2013 | Outwater et al. | 706/12 |
| 2014/0125279 A1* | 5/2014 | Juhasz | 320/109 |
| 2014/0139038 A1* | 5/2014 | Konno | B60L 3/0069 307/104 |
| 2014/0152254 A1* | 6/2014 | Juhasz | B60L 11/1844 320/109 |
| 2014/0211863 A1* | 7/2014 | Katar | B60L 3/0069 375/257 |
| 2014/0239891 A1* | 8/2014 | Martin | B60L 11/182 320/108 |
| 2014/0337253 A1* | 11/2014 | Berezin et al. | 705/412 |
| 2015/0158394 A1* | 6/2015 | Hu | B60L 11/1846 701/22 |

* cited by examiner

VEHICLE AUTHENTICATION FOR A BEV CHARGER

TECHNICAL FIELD

This application relates to authenticating vehicles for use in a battery electric vehicle (BEV) charger.

BACKGROUND

BEV vehicles may consume significantly more electricity to charge than other household appliances. Consequently, charging a BEV vehicle may lead to an increased power consumption. Having unauthorized vehicles charge in a given charging station may lead to a significant increase in electricity-related expenses. This application relates to authentication of a vehicle in a BEV charging station.

SUMMARY

It is an object of the invention to provide a vehicle authentication approach suitable for battery electric vehicle (BEV) applications.

In one embodiment, a vehicle system for use on a vehicle is provided. The vehicle system has a first communication device configured to selectively associate with a second communication device of a premise system based on a location of the vehicle with respect to the premise system and a vehicle identifier. The system further comprises a charging control system configured to permit charging of the vehicle in response to the selective association between the first and second communication devices.

It is appreciated that embodiments of the invention may be implemented in a variety of ways. For example, the charging control system may be further configured to activate a vehicle charger to charge the vehicle in response to the selective association. Further, the first communication device may be further configured to present the vehicle identifier to the second communication device for authentication. The first communication device may be further configured such that the selective association with the second communication device is exclusive.

In another example, the first communication device may be further configured to terminate the selective association with the second communication device when the vehicle travels farther than a predetermined range from the second communication device. The charging control system may be further configured to communicate with a power grid to activate charging of the vehicle.

It is appreciated that various embodiments of the invention may incorporate any one or more of the various contemplated features as appropriate for the particular application of the invention.

In another embodiment of the invention, a system comprises a vehicle system for use on a vehicle including a first communication device. The first communication device is configured to transmit an association request. The association request contains an authentication signal and data regarding the location of the vehicle. The system further comprises a premise system for use on a customer premise. The premise system includes a second communication device configured to receive the association request and to selectively cause the association of the first and second communication devices based on the authentication signal and data regarding the location of the vehicle. A charging control device is configured to permit charging the vehicle in response to the association of the first and second communication devices.

In another embodiment, a vehicle is provided. The vehicle comprises a vehicle system having a first communication device. The first communication device is configured to selectively associate with a second communication device of a premise system based on a location of the vehicle with respect to the premise system and a vehicle identifier. The vehicle system is configured to, in response to the association, generate a charge control command to cause a charging control system to charge the vehicle.

DETAILED DESCRIPTION

Figure 1:
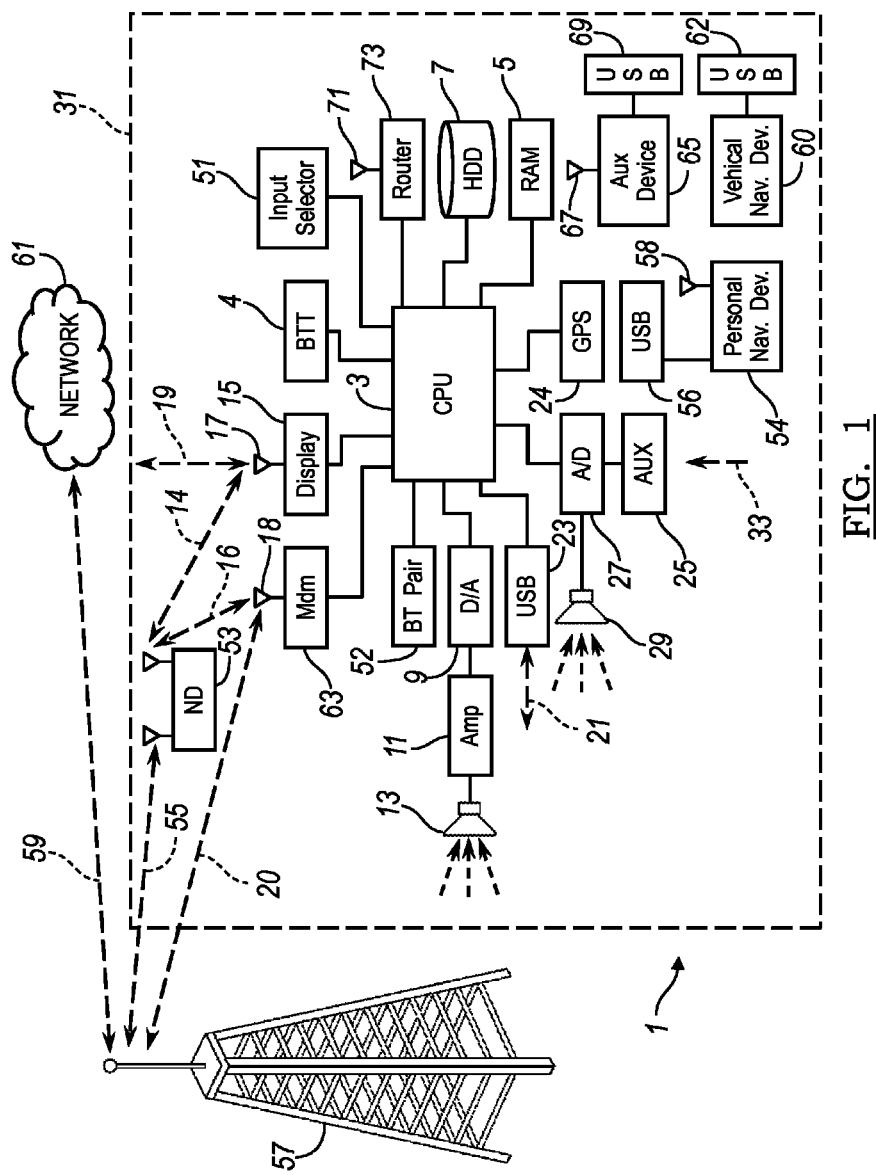
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through button presses and spoken dialog systems with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WI-FI access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the Internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbs for stationary or walking users and 385 kbs for users in a moving vehicle. 3G standards are now being replaced by IMT-Advanced (4G) which offers 100 Mbs for users in a vehicle and 1 Gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, or an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a vehicle-side long range communicator 71. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
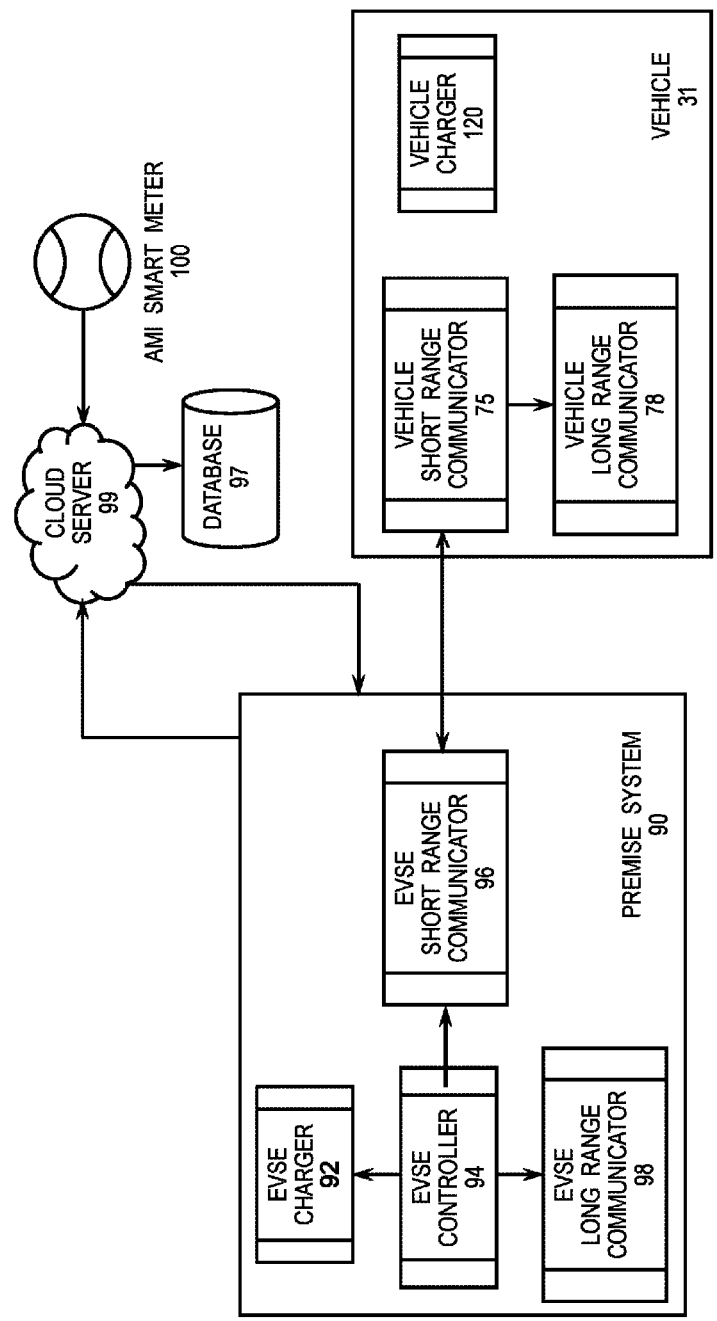
FIG. 2 is a schematic block diagram of the vehicle control system and charging apparatus in one embodiment.

FIG. 2 is a schematic block diagram of the vehicle control system and charging apparatus. Currently, for many plug-in hybrid electric vehicles (PHEV), the power required to charge the vehicle 31 is relatively high compared to other systems. This may lead to an increased drain on the system and increased electric bill. Therefore, the possibility of unauthorized users charging their vehicles in a premise system may result in an excessively high electric bill for the owner of the premise system. This application ensures that the vehicle is authenticated before it is allowed to charge itself on a premise system 90. Within the authentication process, a premise system 90 will confirm that a vehicle 31 is authorized to use a particular charger located on the premise system 90, prior to charging. The premise system 90 consists of a charger, such as an EVSE charger 92 and a charge control device, such as an EVSE controller 94.

The vehicle 31 is equipped with a first communication device, such as a vehicle-side short-range communicator 75. The vehicle 31 drives into the premise system 90. The vehicle 31 has a vehicle charger 120 which couples with the premise system 90 in order to charge the vehicle. The premise system 90 is equipped with a second communication device such as an EVSE short-range communicator 96. In one embodiment, the EVSE controller 94 is also in communication with a power grid, such as an AMI smart meter 100, through a third communication device, such as an EVSE long-range communicator 98. In another embodiment, the EVSE controller 94 may communicate with the AMI smart meter using the vehicle-side long-range communicator 78.

Once the EVSE controller 94 authenticates the vehicle 31, the EVSE short range communicator 96 (second communication device) associates with the vehicle short range communicator 75. The vehicle can be charged only when the two devices are associated. An example of an EVSE short-range communicator 96 may be a RFID receiver. However, there may be other devices that may be used as an EVSE short-range communicator 96. An example of an EVSE long-range communicator 98 maybe a WI-FI radio communicator. When the vehicle 31 drives into the premise system 90, the vehicle-side short-range communicator 75 may transmit a signal to the EVSE short-range communicator 96, alerting the EVSE controller 94 to the vehicle's 31 presence. The EVSE short-range communicator 96 can only receive signals that originate within a short distance. Therefore the EVSE controller 94 recognizes that the vehicle 31 is within docking range.

The EVSE long-range communicator 98 and the vehicle-side long-range communicator 78 may interface with a cloud server 99. The cloud server 99 may be a remote server. The cloud server 99 may contain a database 97. The database 92 contains a list of permitted vehicles for a particular premise system 90. When the EVSE short-range communicator 96 receives an authentication request from a vehicle, the EVSE controller 94, using the EVSE long-range communicator 98, communicates with the cloud server 99. The cloud server 99 verifies if a vehicle is a permitted vehicle 31 through the database 97.

The EVSE controller 94 may communicate with the AMI Smart meter 100 using the cloud server 99. The EVSE long-range communicator 98 communicates with the cloud server 99, which in turn communicates with the AMI smart meter 100. The cloud server 99 may gather information from the AMI smart meter 100 from other vehicles and try to optimize charging patterns and times.

Increased adaptation of electric vehicles may lead to it increasing usage and demand on the power grid. This increased usage and demand on the power grid may lead to problems such as outages and latency if the power grid is not able to accommodate for this usage. Recently, utility and automotive companies have been working to develop a AMI smart meter 100 to address these issues caused by increased usage of electrified vehicles. The AMI smart meter 100 may be able to collect information regarding particular vehicles energy usage and use this data to accommodate the variable usage and drain on the power grid. Presently, the power grid is not able to receive real-time information regarding power-usage pertaining to electric vehicles. Using real-time information regarding power consumption by electric vehicles may allow for the power grid to detect and respond to possible overloads. The power grid may also be able to mitigate or avoid power outages and prevent service disruption.

The AMI Smart meter 100 may be located on the premises. The AMI Smart Meter 100 may also have additional information from the power grid (not shown) allowing the AMI smart meter 100 to communicate with the power grid to access information in regards to cost and usage. Using electricity from a power grid may lead to different costs based on different usage times and locations. If a vehicle is able to get information from the power grid directly, the vehicle may be programmed to optimize charging such that it is the most cost-effective. Presently while many buildings may be equipped with an AMI smart meter 100 to collect information regarding overall usage of power, these meters are not able to directly interface with the PHEV.

Figure 3:
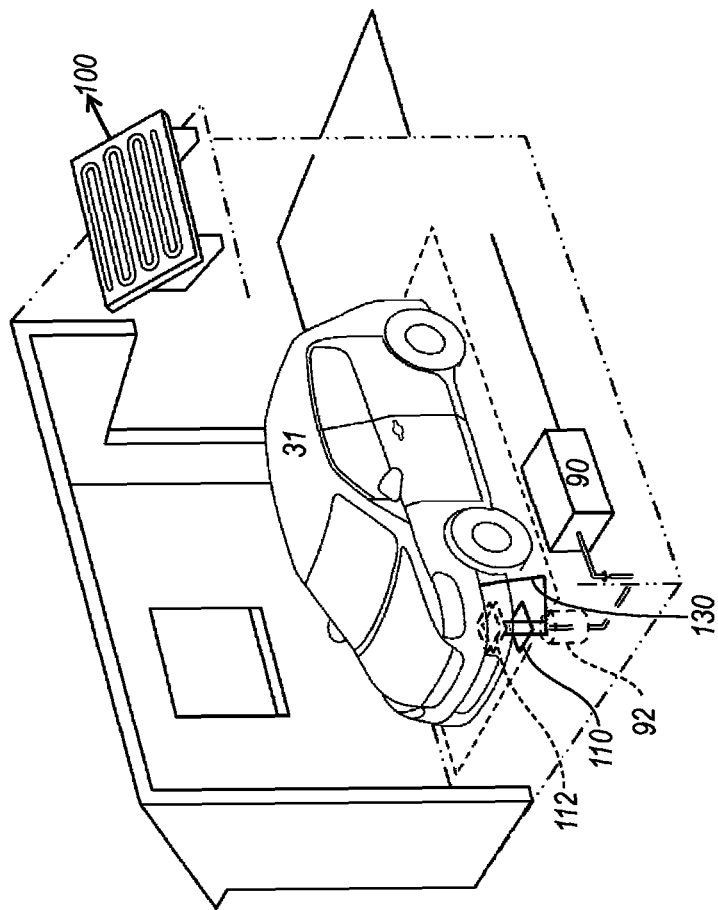
FIG. 3 is an illustration of a docking port for a vehicle.

FIG. 3 is an illustration of a vehicle charging at the premise system. The premise system 90 has the EVSE charger 92. An example of the EVSE charger 92 may be a magnetic induction charger. The EVSE charger 92 is equipped with a primary charging coil 110. The vehicle 31 is equipped with a secondary charging coil 112. The premise system 90 also has an EVSE controller 92 that controls the flow of electricity to the EVSE charger 92.

Figure 4:
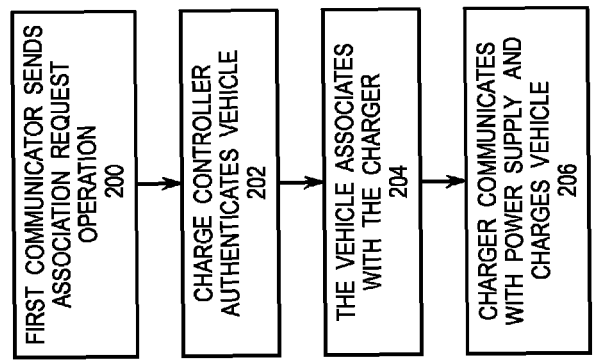
FIG. 4 is a flow chart of the process for authenticating and charging the vehicle in one embodiment.

FIG. 4 is a flow chart illustrating the association process between the vehicle and the premise system in an embodiment of the invention. In block 200, the premise system 90 and the vehicle 31 associate with each other to ensure that the premise system 90 is charging an authenticated vehicle that is authorized to charge in that particular port. In more detail, the vehicle 31 includes a vehicle system having a first communication device, and the premise system 90 includes a second communication device, such as the EVSE short-range communicator 96 (FIG. 2). At block 200, the first communication device, such as the EVSE short-range communicator 75 (FIG. 2) sends an association request to the second communication device. Selective association may occur based on a location of the vehicle with respect to the premise system and a vehicle identification. An association request can be a signal with unique verification information sent to the EVSE short-range communicator 96.

In block 202, the charge controller authenticates the vehicle 31. The vehicle 31 sends verification information, wherein the verification information may include an encrypted authentication protocol which is already known in the art such as the RSA protocol. The EVSE long-range communicator 98 could send the cloud server 99 a request to determine if the vehicle is a permitted vehicle. The cloud server 99 may access a database 97 to determine if this particular vehicle is one of the permitted vehicles. If the vehicle 31 is a permitted vehicle, the EVSE controller 94 allows for the EVSE charger 92 to electrically couple with the vehicle 31.

In block 204, premise system 90 associates with the vehicle. Association occurs once two devices form a communicative link that is authenticated and may be exclusive, if necessary. It also prevents unauthorized vehicles from charging their batteries using the premise system 90. In one particular embodiment, the EVSE short-range communicator 96 may send a unique short-range pulse to the vehicle-side short range communicator 75. The vehicle-side short range communicator 75 can return pulse to indicate its presence near the premise system 90. The EVSE short-range communicator 96 uses the time difference between the time it sends a pulse to the time it receives a return pulse from the vehicle to determine the location of the vehicle. If the return time exceeds a pre-allotted amount, the premise system 90 can turn itself off because the authenticated vehicle is beyond the charging range. Also, the EVSE short-range communicator 96, which is also known as the second communication device, ensures that the association is exclusive. This means that while the second communication device is associated with the first communication device (vehicle-side short range communicator 75), the second communication device cannot associate with another first communication device.

In block 206, the premise system 90 communicates with the AMI smart meter 100 to allow the vehicle to charge. The EVSE long range communicator 98 may communicate with the power grid and enable power supply to the premise system 90. The EVSE controller 94 could allow the premise system 90 to charge the vehicle 31. Once the vehicle 31 is charged, the EVSE controller 94 could use the EVSE long-range communicator 98 to communicate with the power grid to shut off power supply to premise system 90. In another embodiment, the vehicle-side long range communicator could communicate with the power grid. Alternatively, the premise system 90, which is also known as a charging control system, is configured to permit charging of the vehicle in response to the association between the first and second communication devices.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A system comprising:
    a vehicle system for use on a vehicle, the vehicle system including a first communication device being configured to exclusively wirelessly authenticate with a second communication device of a premise system remote from the vehicle, such that the second communication device cannot authenticate with other communication devices while authenticated with the first communication device, based on (i) a time between pulses sent and received by the first communication device indicative of a relative location of the vehicle to the premise system and (ii) a vehicle identifier; and
    a charging control system configured to permit wireless charging of the vehicle in response to the authentication between the first and second communication devices.

2. The system of claim 1 wherein the charging control system is further configured to activate a vehicle charger to wirelessly charge the vehicle in response to the authentication.

3. The system of claim 1 wherein the first communication device is further configured to terminate the authentication when the vehicle travels farther than a predetermined range from the second communication device.

4. The system of claim 1 wherein the charging control system is further configured to communicate with a power grid to activate charging of the vehicle.

5. A system comprising:
    a communicator configured to receive an authentication request from a vehicle and to cause an exclusive authentication between the communicator and vehicle based on the request and a time between pulses sent and received by the communicator indicating proximate distance between the vehicle and communicator such that the communicator cannot authenticate with other vehicles while authenticated with the vehicle; and
    a charger configured to wirelessly charge the vehicle responsive to the authentication.

6. The system of claim 5 wherein the communicator is further configured to communicate with a power grid to activate the charger.

7. The system of claim 5 wherein the charger is further configured to permit coupling between the vehicle and a primary inductive coil authenticated with the charger in response to the authentication.

8. A vehicle comprising:
    a first communicator configured to
        wirelessly authenticate with a second communicator of a premise system based on a vehicle identifier and a time between pulses sent and received by the first communicator indicating proximate distance between the vehicle and premise system such that the second communicator cannot authenticate with other communicators, and
        responsive to the authentication, generate a charge control command to cause a remote charger to wirelessly charge the vehicle.

9. The vehicle of claim 8 wherein the first communicator is further configured to send communication for and receive communication from a power grid.

10. The vehicle of claim 8 wherein the first communicator further communicates an authentication request to the second communicator.

11. The vehicle of claim 10 wherein the authentication request further includes the vehicle identifier and an authentication protocol.

12. The vehicle of claim 8 wherein the authentication between the first and second communicators terminates upon the first communicator moving a predetermined range away from the premise system.

* * * * *